US010029740B2

(12) United States Patent
Schnaufer et al.

(10) Patent No.: US 10,029,740 B2
(45) Date of Patent: Jul. 24, 2018

(54) COMPONENT ARRANGEMENT

(71) Applicant: Bayerische Motoren Werke Aktiengesellschaft, Munich (DE)

(72) Inventors: Thomas Schnaufer, Oberhausen (DE); Andreas Beil, Munich (DE); Simon Spitzer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/130,238

(22) Filed: Apr. 15, 2016

(65) Prior Publication Data

US 2016/0229466 A1 Aug. 11, 2016

Related U.S. Application Data

(63) Continuation of application No. PCT/EP2014/071618, filed on Oct. 9, 2014.

(30) Foreign Application Priority Data

Oct. 18, 2013 (DE) ........................ 10 2013 221 168

(51) Int. Cl.
*B62D 29/04* (2006.01)
*B29C 70/30* (2006.01)
(Continued)

(52) U.S. Cl.
CPC ............ *B62D 29/048* (2013.01); *B29C 70/30* (2013.01); *B32B 7/04* (2013.01); *B62D 25/04* (2013.01); *B62D 29/043* (2013.01); *F16B 11/00* (2013.01); *B29C 66/1248* (2013.01); *B29C 66/721* (2013.01); *B29C 66/723* (2013.01); *B29C 66/7212* (2013.01); *B29C 66/73921* (2013.01); *B29C 66/73941* (2013.01); *B29L 2031/30* (2013.01); *B29L 2031/3011* (2013.01);
(Continued)

(58) Field of Classification Search
CPC ....... B62D 29/048; B62D 25/02; B62D 25/04
USPC ..... 296/29, 30, 210, 203.02, 193.06, 203.03
See application file for complete search history.

(56) References Cited

U.S. PATENT DOCUMENTS 8,652,606 B2 * 2/2014 Griess ................. B32B 3/06
428/58
8,894,801 B2 * 11/2014 Griess ................. B32B 3/06
156/304.1
(Continued)

FOREIGN PATENT DOCUMENTS

CN 102089147 A 6/2011
CN 103038051 A1 4/2013
(Continued)

OTHER PUBLICATIONS

Chinese-language Office Action issued in counterpart Chinese Application No. 201480046984.5 dated Oct. 27, 2016 with English translation (12 pages).
(Continued)

*Primary Examiner* — Dennis H Pedder
(74) *Attorney, Agent, or Firm* — Crowell & Moring LLP

(57) ABSTRACT

A component arrangement having a first component and a second component is provided. At least one component has a plurality of preforms, wherein the plurality of preforms of the first component overlap a preform of a second component in the connecting region of the two components.

2 Claims, 1 Drawing Sheet

(51) Int. Cl.
  *B62D 25/04*     (2006.01)
  *F16B 11/00*     (2006.01)
  *B32B 7/04*      (2006.01)
  *B29L 31/30*     (2006.01)
  *B29C 65/00*     (2006.01)
  *B62D 25/02*     (2006.01)

(52) U.S. Cl.
  CPC ... *B29L 2031/3041* (2013.01); *B32B 2605/08* (2013.01); *B62D 25/02* (2013.01); *B62D 25/025* (2013.01)

(56) References Cited

U.S. PATENT DOCUMENTS

| | | | | |
|---|---|---|---|---|
| 8,993,084 | B2* | 3/2015 | Griess | B32B 5/26 |
| | | | | 428/60 |
| 9,522,512 | B2* | 12/2016 | Georgeson | B29C 65/48 |
| 2009/0148647 | A1* | 6/2009 | Jones | B29C 70/30 |
| | | | | 428/58 |
| 2011/0101731 | A1 | 5/2011 | Legler et al. | |
| 2011/0198020 | A1 | 8/2011 | Marengo et al. | |
| 2015/0129113 | A1* | 5/2015 | Griess | B32B 5/26 |
| | | | | 156/92 |

FOREIGN PATENT DOCUMENTS

| | | |
|---|---|---|
| DE | 41 39 523 A1 | 6/1993 |
| DE | 298 18 803 U1 | 4/2000 |
| DE | 10 2008 029 056 A1 | 12/2009 |
| DE | 10 2010 046 609 A1 | 5/2011 |
| DE | 10 2011 089 158 A1 | 6/2013 |
| DE | 10 2011 089 173 A1 | 6/2013 |
| EP | 0 995 666 A1 | 4/2000 |
| EP | 2 474 409 A1 | 7/2012 |
| JP | 58-28362 A | 2/1983 |
| JP | 8-216683 A | 8/1996 |
| JP | 11-286055 A | 10/1999 |
| JP | 2002-362236 A | 12/2002 |
| JP | 2006-218821 A | 8/2006 |
| JP | 2010-155403 A | 7/2010 |
| WO | WO 2011/095834 A1 | 8/2011 |

OTHER PUBLICATIONS

International Search Report (PCT/ISA/210) issued in PCT Application No. PCT/EP2014/071618 dated Dec. 23, 2014 with English translation (seven pages).

German Search Report issued in counterpart German Application No. 10 2013 221 168.6 dated Jul. 16, 2014 with partial English translation (12 pages).

* cited by examiner

COMPONENT ARRANGEMENT

CROSS REFERENCE TO RELATED APPLICATIONS

This application is a continuation of PCT International Application No. PCT/EP2014/071618, filed Oct. 9, 2014, which claims priority under 35 U.S.C. § 119 from German Patent Application No. 10 2013 221 168.6, filed Oct. 18, 2013, the entire disclosures of which are herein expressly incorporated by reference.

BACKGROUND AND SUMMARY OF THE INVENTION

The invention relates to a component arrangement including a first component and a second component, wherein at least one component has a plurality of preforms.

In modern vehicle construction, great efforts are made to reduce the fuel consumption of the vehicles. A significant role is played here by the reduction in overall weight, since the mass of the vehicle, i.e. the vehicle weight, has a direct effect on the fuel consumption. The materials used play a critical role, since they contribute not only to the component weight, but also to the component stiffness. In recent times, vehicle construction has started making use of fiber-reinforced plastics. In the case of these materials, reinforcing fibers are embedded in a plastic matrix made of epoxy resin. Large fiber-reinforced plastic components which are used as structural components in vehicle construction are produced in one shot from a plurality of individual preforms. Such preforms are dry fiber mats which, in a preceding forming step, have been trimmed to near-net shape and formed into a predetermined geometry. For optimum-weight and waste-reduced production, it is necessary to have various preforms with different wall thicknesses and layer constructions. In a following step, these preforms are impregnated with the matrix-forming plastic or resin, for example in a resin transfer mould. Since the interconnected component arrangements are produced in one shot, preform overlaps are necessary.

It is known from the prior art to generate a single-shear preform overlap, for example for the side-frame subassembly of a vehicle, in the region in which the A pillar butts against the roof frame.

This one-sided or single-shear preform overlap, accordingly, means that only a limited force can be transmitted from one component to the other component. At these locations, force transmission takes place solely via pure resin, and this gives rise to weak points at the preform overlap in the side-frame subassembly.

In order to counteract these weak points, the prior art has attempted to increase the length of overlap in the region of the preform overlap. The single-shear or one-sided preform overlap, however, is accompanied by the disadvantage that a pronounced S curve is necessary, and this adversely affects the functioning of the component to a great extent.

Proceeding from this prior art, it is an object of the present invention to provide a simplified component arrangement which overcomes the disadvantages of the prior art. Furthermore, it is a particular object of the invention to provide a component arrangement which is distinguished by high mechanical characteristic values in the connecting region of the two components.

This and other objects are achieved by a component arrangement having a first and a second component, wherein at least one component has a plurality of preforms. In the connecting region of the two components, a plurality of preforms of the first component overlap a preform of the second component. Instead of a single-shear preform overlap, this generates a double- or multi-shear preform overlap, as a result of which the overlap surface areas, i.e. the surface areas over which preforms of one component are in contact with preforms of a second component, is increased. This improves the mechanical characteristic values of the component arrangement, and therefore the component arrangement can absorb higher forces.

It is also possible for the components to be designed in the form of fiber-reinforced components with a matrix made of duroplastic or of thermoplastic material, in which reinforcing fibers made of carbon, glass, aramid and/or basalt are embedded.

Furthermore, the components may be structural components for vehicles, formed from a plurality of preforms. Structural components in the context of this invention may be, in particular, frame rails, A, B, C or D pillar reinforcements, roof bows, inner or outer side frames, ring carriers, an end wall, a tunnel, a floor panel and/or reinforcements of the side sills.

In a first embodiment of the invention, the first component is an A pillar of a vehicle and the second component is a roof frame of a vehicle. Each of these components may be formed from one or more preforms.

It is also possible for the A pillar to be of two-part construction with an inner shell and an outer shell, wherein each shell includes at least two preforms. The A pillar therefore has a four-layered construction, which makes it possible to realize a large contact surface area in the overlap portion. Subdividing the A pillar into two or more individual preforms allows the wall thickness of these individual preforms to be reduced such that the sum of the wall thicknesses of the divided-up preforms corresponds approximately to the wall thickness of a prior-art preform, which is fastened on the roof frame by way of just a single-shear overlap.

Furthermore, the roof frame may be of multi-part construction and have at least one inner shell and an outer shell. Each of these shells, in turn, may have one or more preforms, which can be brought into contact with the preforms of the A pillar in the overlap portion.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
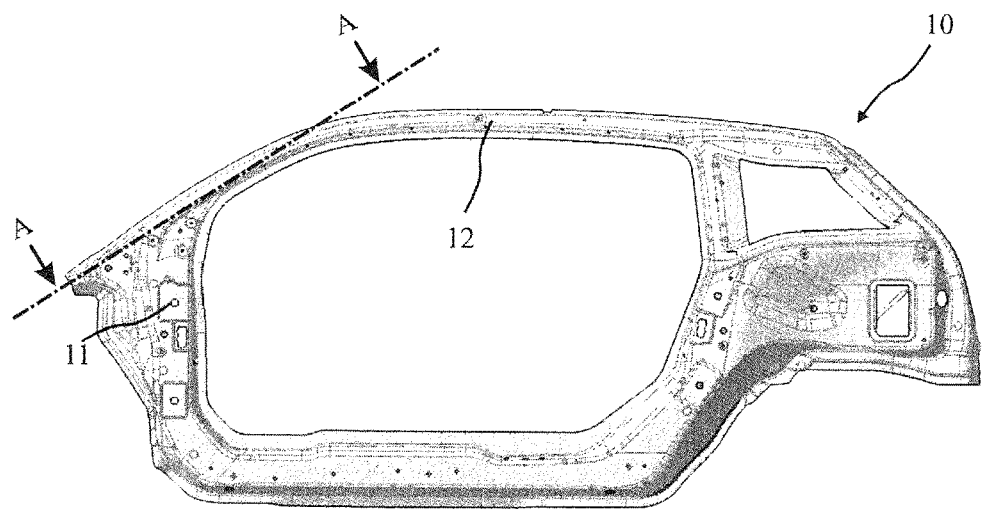
FIG. 1 is a side view of a side frame of the vehicle.

FIG. 1 illustrates, by way of example, a side-frame subassembly. The geometry here is intended to be purely illustrative and should not limit the present invention. In the front region of the vehicle, illustrated on the left-hand side in FIG. 1, the side frame 10 has an A pillar 11, which is connected, at its upper end, to the roof frame 12.

Figure 2:
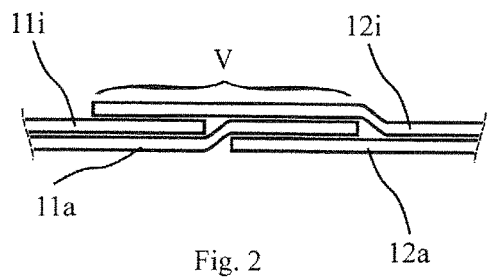
FIG. 2 is a sectional view from FIG. 1 taken along section line A-A, relating to the prior art.

The prior art connection is formed in the manner illustrated in FIG. 2. The A pillar is of two-shell construction with an outer shell 11a and an inner shell 11i. The roof frame 12 is likewise of two-shell construction with an outer shell 12a and an inner shell 12i. All the shells are formed from fiber-reinforced plastic material. In the connecting region V, the individual shell elements overlap one another, and are in contact with one another over a contact surface area.

Figure 3:
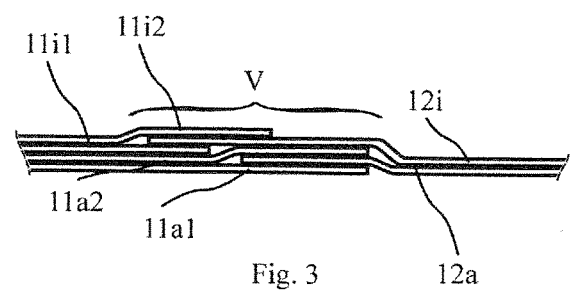
FIG. 3 is a sectional view taken along section line A-A from FIG. 1, relating to one embodiment of the present invention.

The invention, which differs from the latter, is illustrated in the embodiment shown in FIG. 3. As can be seen from FIG. 3, the A pillar 11 is likewise of two-shell construction with an outer shell and an inner shell. The outer shell, once again, is formed from two preforms 11a1 and 11a2. The inner shell likewise comprises two preforms 11i1 and 11i2. Here too, the roof frame 12 is of two-shell construction with an outer shell 12a and an inner shell 12i, each formed from a preform. In the connecting region V, the preforms of the A pillar 11 partially overlap the preforms of the roof frame 12. As can be seen, the preforms of the outer shell of the A pillar 11a1 and 11a2 overlap the preform of the outer shell of the roof frame 12a on either side. This means that the preform 12a, on its outer side, is in contact with the preform 11a1 of the A pillar 11 and, on its inner side, is in contact with the preform 11a2 of the outer shell of the A pillar 11. Therefore, in the case of a double-sided, undercut connection, the contact surface area is double the size of a single-shear connection. In an analogous manner, the preforms 11i1 and 11i2 of the inner shell of the A pillar 11 enclose the preform 12i of the inner shell of the roof frame on either side. As can be seen from FIG. 3, the inner preform 11i2 of the A pillar 11 is longer, and overlaps the inner preform 12i of the roof frame 12 over a longer extent than the inner preform 11i1.

In principle, there is no need for the preforms of the A pillar 11 to enclose the preforms of the roof frame 12 symmetrically; rather, they may have a larger contact surface area on one side than on the other side, as is illustrated by way of example and in representative form in FIG. 3 by the preforms 11i1 and 11i2. The present invention can considerably reduce the risk of a weak point in the overlap portion or connecting portion. Furthermore, there is also a considerable reduction in the jump in geometric stiffness at such a connecting location.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component arrangement, comprising:
a first component that is an A-pillar of a motor vehicle;
a second component that is a roof frame of the motor vehicle, wherein
the first and second components comprise a plurality of preforms, and
in a connecting region of the first and second components, the plurality of preforms of the first component overlap the plurality of preforms of the second component, in such a way that
a preform of an outer shell of the roof frame, on an outer side thereof, is in contact with an outermost preform of an outer shell of the A pillar, and the preform of the outer shell of the roof frame, on an inner side thereof, is in contact with another preform of the outer shell of the A pillar,
a preform of an inner shell of the roof frame, on an outer side thereof, is in contact with an outermost preform of an inner shell of the A pillar, and the preform of the inner shell of the roof frame, on an inner side thereof, is in contact with both: i) the another preform of the outer shell of the A pillar, and ii) another preform of the inner shell of the A pillar.

2. The component arrangement according to claim 1, wherein
the first and second components are fiber-reinforced components having a matrix made of duroplastic or thermoplastic material, in which reinforcing fibers made of one of carbon, glass, aromid, and/or basalt are embedded.

* * * * *